united States Patent [19]
Comstock et al.

[11] Patent Number: 5,198,116
[45] Date of Patent: Mar. 30, 1993

[54] METHOD AND APPARATUS FOR MEASURING THE FOULING POTENTIAL OF MEMBRANE SYSTEM FEEDS

[75] Inventors: Daniel L. Comstock, Escondido; Lee A. Durham, Oceanside, both of Calif.

[73] Assignee: D.W. Walker & Associates, San Marcos, Calif.

[21] Appl. No.: 832,941

[22] Filed: Feb. 10, 1992

[51] Int. Cl.$^5$ .............................................. B01D 65/10
[52] U.S. Cl. ................................. 210/636; 73/61.63; 73/61.64; 210/87; 210/257.2; 210/321.65; 210/321.69; 210/709; 210/746
[58] Field of Search .......................... 73/61.63, 61.64; 210/85, 87, 96.1, 96.2, 106, 108, 193, 194, 198.1, 321.6, 321.69, 321.65, 321.84, 500.41, 636, 639, 739, 746, 791, 709, 257.2, 258; 340/607; 422/68.1, 82.01; 436/178, 806; 204/153.1

[56] References Cited

U.S. PATENT DOCUMENTS

| 3,368,144 | 2/1968 | Gerdes | 422/82.01 |
| 3,594,313 | 7/1971 | Carlson | 210/96.2 |
| 3,674,152 | 7/1972 | Manjikian | 210/456 |
| 4,125,462 | 11/1978 | Latty | 210/193 |
| 4,921,610 | 5/1990 | Ford et al. | 210/636 |

FOREIGN PATENT DOCUMENTS

| 1-191038 | 8/1989 | Japan | 210/85 |
| 2-147633 | 6/1990 | Japan | 210/108 |
| 965474 | 10/1982 | U.S.S.R. | 210/746 |

Primary Examiner—Robert A. Dawson
Assistant Examiner—Joseph Drodge
Attorney, Agent, or Firm—Gregory Garmong

[57] ABSTRACT

The optimum antifoulant concentration and cleaning interval for reverse osmosis membranes is determined by providing samples of a liquid to be purified in a reverse osmosis system, the samples having a range of antifoulant concentrations added. The zeta potential for each sample is measured, and the amount of antifoulant that provides the lowest (most negative) zeta potential is selected as the preferred antifoulant concentration. A cleaning frequency sample of the liquid to be purified with the preferred antifoulant concentration is prepared and passed across a cleaning frequency membrane that passes dissolved matter in the permeate but does not pass colloidal material. The rate of change in flow of the permeate of the cleaning frequency sample is measured as a function of time, and the cleaning frequency of the cleaning frequency sample is determined. In one embodiment, the cleaning frequency membrane used in the testing is comparable to the filter support used in the reverse osmosis system, but has no separation membrane thereon. A test cell for measuring permeation through the cleaning frequency membrane is provided.

13 Claims, 5 Drawing Sheets

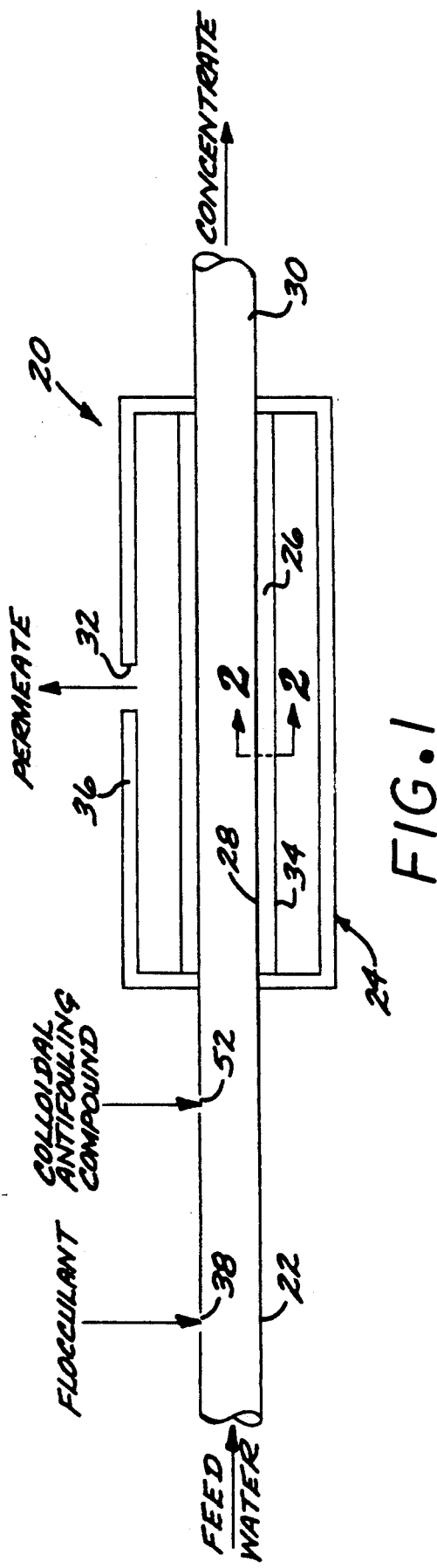
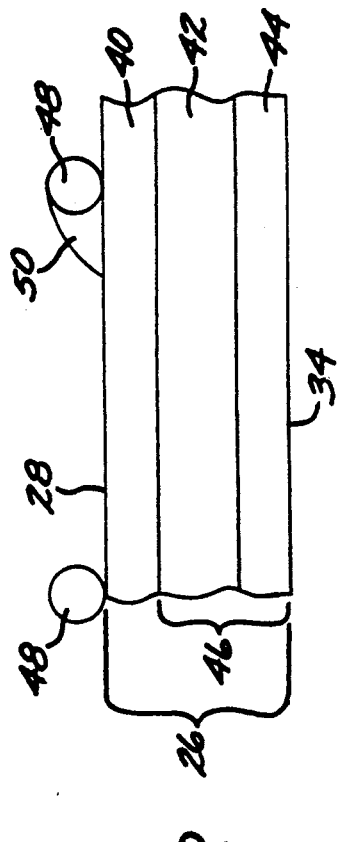

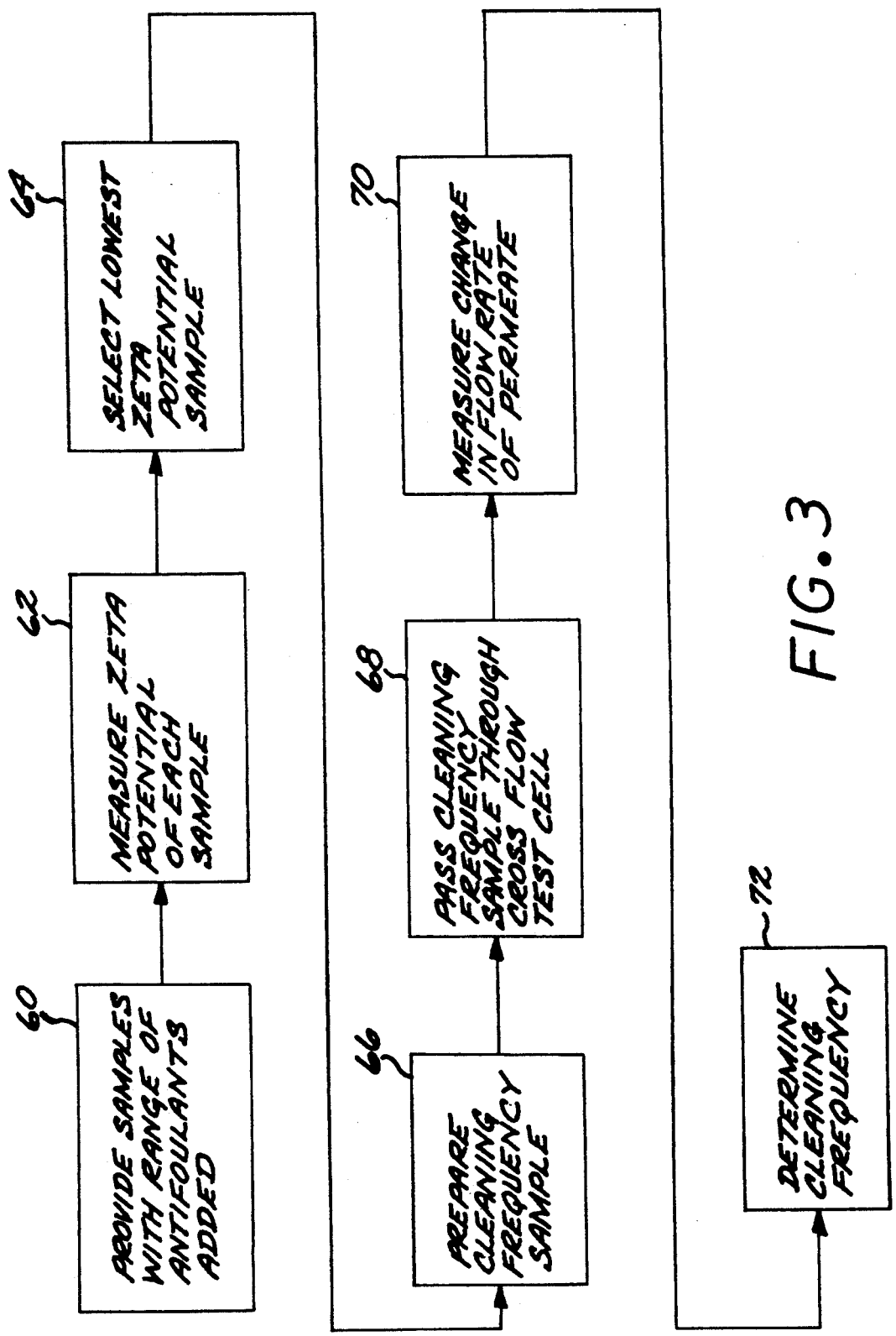

METHOD AND APPARATUS FOR MEASURING THE FOULING POTENTIAL OF MEMBRANE SYSTEM FEEDS

BACKGROUND OF THE INVENTION

This invention relates to reverse osmosis liquid purification systems, and, more particularly, to establishing the operating and maintenance procedures for such a system.

Reverse osmosis is used to purify liquids that contain dissolved and undissolved impurities, in a variety of industrial, commercial, and home applications. The liquid to be treated is passed over a reverse osmosis membrane in a cross flow manner. Some of the liquid, termed the "permeate", passes through the reverse osmosis membrane and is collected as the purified liquid that is the objective of the procedure. The remainder of the liquid, now having a higher concentration of the impurities and termed the "concentrate", is discarded or futher processed. The permeate has a lower concentration of impurities than does the concentrate.

Although much of the impurity material leaves the reverse osmosis unit in the concentrate, some remains adhered to the reverse osmosis membrane as a colloidal solid. Undissolved impurities include substances found widely in process liquids such as clays, silica, iron and aluminum hydroxides, and organic debris, and also substances that may be peculiar to a particular application such as paint pigments, proteins, high-molecular-weight alcohols, and bacterial and yeast cells. Flocculents may be added to the impure liquid upstream of the reverse osmosis unit, and prior to its passing through filters or clarifiers, to cause colloidal solids to form, so that the impurities in the colloidal solids may be removed by the filters or clarifiers.

The colloidal solids adhering to the reverse osmosis membrane gradually build up over time, eventually forming layers of colloidal solid material that interfere with the operation of the reverse osmosis membrane and decrease its efficiency. This gradual reduction of operational efficiency is termed "colloidal fouling". The result of colloidal fouling is that the permeate flow rate is gradually reduced and eventually becomes unacceptably low.

When the mass of colloidal solids on the reverse osmosis membrane becomes so thick and dense that the permeate flow is reduced to an unacceptably low level, the reverse osmosis unit is removed from service and cleaned. Such units are typically designed as integral tubular housings containing the reverse osmosis membranes in a rolled-up form, that can be removed from the reverse osmosis system, replaced by a spare unit so that the system continues to operate, and sent to a cleaning operation. Alternatively, they may be removed from service and cleaned in place. In the cleaning operation, the colloidal solids are removed and the unit is otherwise reconditioned. The cost of each reverse osmosis unit is such that cleaning is economically attractive as compared with installing a new unit each time the colloidal fouling becomes excessive.

The incidence of colloidal fouling depends upon the nature and impurity content of the liquid that is being passed through the reverse osmosis system. Typically, the more contaminated is the liquid with impurities that form colloidal deposits, the more often is cleaning required. It is desired to increase the time between cleanings as much as possible, and to know the typical time between cleanings as precisely as possible to permit the designing of the reverse osmosis system with as little overdesign as possible, to reduce down time for maintenance, and to minimize the number of spare reverse osmosis units that must be kept on hand.

An important advance in reverse osmosis systems has been the development of antifouling compositions that are introduced into the feed liquid, typically a contaminated water, upstream of the reverse osmosis unit. The antifouling compositions, added in amounts of parts per million to the contaminated liquid, chemically alter the nature of the colloidal solids so that they are less prone to adhere to the reverse osmosis membranes. That is, the treated colloidal solids tend to pass out of the system in the concentrate rather than stick to the reverse osmosis membrane and cause colloidal fouling.

The amount of the antifouling compcund added to the liquid to be treated must be controlled precisely. If either too little or too much is added, the rate of colloidal fouling is greater than if an optimum amount is added. Moreover, if too much antifouling compound is added, the excess over the optimum amount is wasted. Since reverse osmosis units are often used to process very large amounts of liquid, such as drinking water supplies, small amounts of wasted antifouling compound (as measured in parts per million) can become expensive.

There are two principal issues that must be resolved as to the proper concentration of an operable antifouling compound to be added to the liquid being treated. First, the optimum concentration must be established. The optimum concentration varies with each type of feed liquid, and no generalization or a priori prediction technique is known. Second, with this optimum concentration established, the frequency of cleaning of the reverse osmosis units must be determined.

In current practice, the optimum concentration of the antifouling compound and the cleaning frequency are established by a trial-and-error process. Various amounts of the antifouling compound are added to the liquid being treated, the reverse osmosis system is operated for a period of months, and the reverse osmosis units are removed from service and evaluated. As an aid in making the determination, the feed liquid is usually characterized as to the amount of undissolved material by a standardized silt density index ("SDI") test known in the industry. In the SDI test, a fixed quantity of the feed liquid is passed through a standard absolute 0.45 micrometer filter and the amount of particulate captured by the filter is determined by the weight gain of the filter during the test. In practice, it is observed that the SDI test does not accurately characterize the colloidal fouling tendency of reverse osmosis membranes and units.

Consequently, at the present time the determination of optimum additions of colloidal antifouling compounds and the maintenance schedules of reverse osmosis membranes and units remains largely a matter of trial-and-error that requires months of non-optimal use of the reverse osmosis process to find the optimum operating and maintenance parameters. If there is a change in the nature of the feed liquid or of the colloidal antifouling composition, the trial-and-error process must be repeated (although the prior conditions usually provide some guidelines). There is therefore a need for an improved technique for determining the required addition of antifouling compound and the associated maintenance period of the reverse osmosis unit. The present invention fulfills this need, and further provides related advantages.

SUMMARY OF THE INVENTION

The present invention provides a test method and apparatus in which the optimum concentration (i.e., addition) of colloidal antifouling compound is determined, and the required time between reverse osmosis membrane cleanings is predicted to a good degree of accuracy. The technique yields this information in a short period of time, with only a small sample of the feed liquid required. In a preferred embodiment that has been implemented for evaluation purposes, the optimum antifouling compound concentration and reverse osmosis unit maintenance information are determined in less than 30 minutes, using a sample of less than 5 gallons of the feed liquid. A number of different antifouling compounds may be evaluated for each application to determine the one which is best for that particular application. The tailoring of antifouling compositions for particular applications also becomes feasible, since each composition can be evaluated in a few minutes without requiring the full-scale reverse osmosis unit to be taken off-line.

In accordance with the invention, a method of determining the optimum antifoulant concentration and cleaning interval for reverse osmosis membranes, comprises the steps of providing samples of a liquid to be purified in a reverse osmosis system, the samples having a range of antifoulants added, measuring the zeta potential for each sample, and selecting the concentration of antifoulant that provides the lowest zeta potential as the preferred antifoulant concentration.

Once the preferred antifoulant concentration has been determined, the maintenance schedule of the reverse osmosis membrane is established. According to the invention, the method includes the steps of preparing a cleaning frequency sample of the liquid to be purified with the preferred antifoulant concentration and passing the cleaning frequency sample in a cross flow manner across a cleaning frequency membrane that passes dissolved matter in the permeate but does not pass colloidal material. The rate of change in flow of the permeate of the cleaning frequency sample is measured as a function of time, and the cleaning frequency of the cleaning frequency sample is determined from the change in flow as a function of time.

The zeta potential of the samples with various concentrations of the antifouling composition added is determined with a conventional zeta potential apparatus. A new apparatus has been developed for the determination of the cleaning frequency. The invention further provides a test apparatus for use in determining the required cleaning frequency for a reverse osmosis membrane element. The test apparatus comprises means for supplying a flow of a liquid to be purified by reverse osmosis to a test cell. The test cell includes a cleaning frequency membrane having a high permeation rate. In one embodiment, the cleaning frequency membrane may be a filter support used in a reverse osmosis membrane, but having no separation membrane thereon which would reduce the permeation rate. There is an inlet for introducing a flow of the liquid to be purified to a first side of the cleaning frequency membrane, a concentrate outlet on the first side of the cleaning frequency membrane arranged so that the flow of liquid passes over the first side of the cleaning frequency membrane in flowing from the inlet to the concentrate outlet, and a permeate outlet on a second side of the cleaning frequency membrane. There is also means for measuring the time rate of flow of permeate, which may be part of the apparatus or conducted separately.

In applying the method of the invention, a series of samples of the actual reverse osmosis feed liquid, typically a contaminated water, is prepared with varying amounts of the colloidal antifouling compound under evaluation. The samples are typically about 100 milliliters each. The zeta potential of each sample is determined. The preferred concentration of the colloidal antifouling composition is that concentration which yields the minimum zeta potential (i.e., most negative value). By way of illustration of the ranges involved and not of limitation, in evaluating a number of contaminated water feeds with commercial colloidal antifouling compositions, the preferred compositions have typically been in the 3-10 parts per million range. Various antifouling compositions and mixtures can be evaluated quickly by this approach.

Once the optimum concentration of colloidal antifouling composition is determined, the frequency of maintenance of the reverse osmosis membranes and units can be predicted. (The maintenance frequency could also be predicted for non-optimum concentrations by the present approach, but that prediction is usually of no practical significance.) A sample of the feed liquid with the optimum concentration of the colloidal antifouling composition is prepared. The sample is circulated through the described test cell, and the permeate rate of flow is measured at different times to determine the rate of change in flow. This rate of change is used to predict the required maintenance period, or can be used to calculate a cross flow fouling index ("CFI") that is used to predict the required maintenance period. The cross flow fouling index has been correlated with the performance of reverse osmosis membranes and units in service, establishing the viability of the technique.

The present invention provides a major advance in the use of reverse osmosis purification systems. An optimum concentration of colloidal antifouling compound and the associated maintenance period for a reverse osmosis unit in service are established quickly without removing the unit from service. Other features and advantages of the invention will be apparent from the following more detailed description of the invention, taken in conjunction with the accompanying drawings, which illustrate, by way of example, the principles of the invention.

BRIEF DESCRIPTION OF THE DRAWINGS

FIG. 1 is a schematic depiction of a reverse osmosis unit;

FIG. 2 is a sectional view of a reverse osmosis membrane, taken generally on line 2—2 of FIG. 1;

FIG. 3 is a block diagram of the approach of the invention;

DETAILED DESCRIPTION OF THE INVENTION

Figure 4:
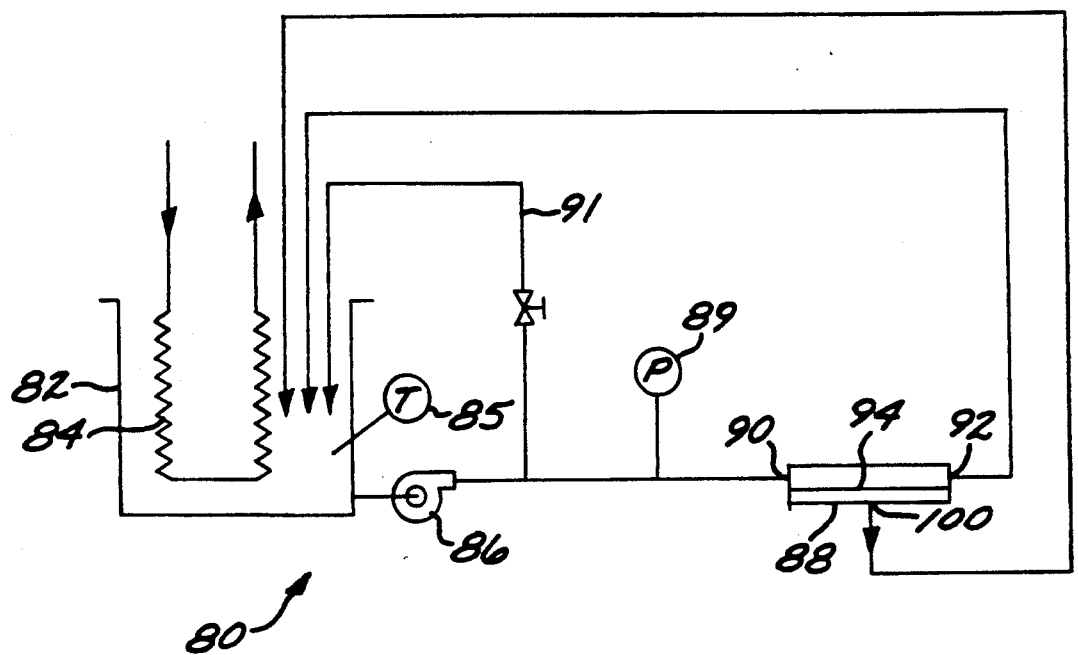
FIG. 4 is a diagrammatic view of the cross-flow test apparatus for measuring the rate of change of permeate flow with time.

A conventional reverse osmosis ("RO") unit 20 is depicted schematically in FIG. 1. The RO unit 20 includes a feed inlet 22 to a hollow tubular housing 24. Within the housing 24 is a tubular reverse osmosis ("RO") membrane 26. The feed liquid, typically impure or contaminated water, is supplied to one side ("inlet side") 28 of the RO membrane 26. To optimize the use of the space within the housing 24, the membrane 26 is usually rolled up in a spiral or jelly-roll fashion, with the feed liquid introduced into the interior of the membrane 26 as illustrated.

The housing 24 has a concentrate outlet 30 on the same side 28 of the RO membrane 26 as the feed inlet 22, but spaced apart from the feed inlet 22 so that the feed liquid must pass over the RO membrane 26 in a cross flow direction. In the usual design, the feed inlet 22 is at one end of the tubular housing 24, and the concentrate outlet 30 is at the other end. The housing 24 further has a permeate outlet 32 on an opposite side 34 of the RO membrane 26 from the inlet side 28. In the usual design, the permeate outlet 32 is in a side wall 36 of the housing 24. The permeate is the desired product of the RO unit 20, and the concentrate is discarded or further processed.

A flocculent (also sometimes termed a "coagulant") is typically added to the feed liquid at a flocculent addition port 38 upstream of the RO membrane 26 (which is also upstream of any filter or clarifier, not shown here), to encourage precipitation of contaminants that may be removed as solids from the feed liquid by the filter or clarifier. Commercial flocculents are well known, and include, for example, aluminum sulfate, ferric sulfate, and cationically charged organic polymers.

FIG. 2 illustrates the structure of the RO membrane 26 in greater detail. The RO membrane 26 usually has a three-layer construction. A molecular sieve separation layer 40 faces the feed liquid on the inlet side 28. The layer 40 is typically about 250-2000 Angstroms thick and is made of cellulose acetate or polyamide. The layer 40 is supported on a microporous layer 42. The layer 42 is typically about 0.03 millimeters thick and is made of a polysulfone. The layer 42 rests upon a base layer 44. The base layer 44 is typically about 0.15 millimeters thick and is made of polyester. As used herein, the layer 42 and the layer 44 are together termed the filter support 46. The structure of RO membranes is well known, and they are widely available commercially.

FIG. 2 also illustrates the mechanism of colloidal fouling. As discussed earlier, the RO membrane 26 is usually rolled up into a spiral configuration within the housing 24. To keep the adjacent layers of RO membrane from pressing together against each other so that there is no space for the permeate to flow, a fibrous spacer is placed on one side of the RO membrane 26 before it is rolled into a spiral. FIG. 2 illustrates two fibers 48 of this spacer layer on the inlet side 28 of the membrane 26.

The solid colloidal material has a tendency to deposit against the fibers 48 to form colloidal deposits 50. As the colloidal deposits 50 enlarge and thicken with the passage of time during use of the RO unit 20, the inlet side 28 is increasingly obscured, resulting in a progressive reduction of the efficiency of the RO unit as measured in amount of permeate per unit area of membrane per unit time. The necessity to remove colloidal deposits 50 requires periodic cleaning of the RO membrane 26.

To reduce the amount of accumulation of the colloidal deposits 50, a colloidal antifouling compound is introduced into the feed liquid at a colloidal antifouling addition port 52. The port 52 is downstream of the flocculent addition port 38 and downstream of any filters or clarifiers, but upstream of the RO membrane 26. The colloidal antifouling compound alters the chemical structure of the colloidal material that otherwise forms the deposit 50. The colloidal material modified by the antifouling compound has a reduced tendency to adhere to the RO membrane 26, and is carried through the housing 24 and out the concentrate outlet 30. The result is to increase the period between required cleanings of the RO membrane 26 to remove colloidal deposits. Colloidal antifouling compounds are known in the art, and are commercially available.

The present invention is concerned, in its preferred embodiment, with determining the optimum amount of colloidal antifouling compound to add to the feed liquid, and the resulting periods between maintenance cleanings. As discussed previously, in current practice the proper amount of the colloidal antifouling compound and the maintenance periods are determined primarily by trial-and-error using the actual reverse osmosis units while they are in service. The result is that there are long periods of inefficient use of the reverse osmosis units while optimum procedures are developed.

FIG. 3 illustrates in block diagram form the approach of the invention. A quantity of the actual feed liquid to be purified by the RO unit 20 is obtained. For the entire procedure as presently implemented, 5 gallons of the feed liquid is usually sufficient. The actual feed liquid is used to duplicate the complex chemical makeup of the liquid in the present approach. Samples with a range of the candidate colloidal antifouling compound (or compounds, or mixtures of compounds) are prepared, numeral 60. For example, individual samples with 0, 2, 4, 6, 8, and 10 parts per million, respectively, of a particular colloidal antifouling compound might be prepared.

The zeta potential of each sample is measured, numeral 62. Zeta potential measurement is a known technique for determining the negative potential surrounding a colloidal particle. The technique of zeta potential measurement is described in "Everything You Want to Know About Coagulation and Flocculation", published by Zeta Meter, Inc., 1990. Zeta potential measurement apparatus is available commercially, as for example the Model 3.0 available from Zeta Meter, Inc. Zeta potential measurements require on the order of one minute per sample to complete.

The concentration of colloidal antifouling compound producing the lowest (most negative number) zeta potential is determined, numeral 64. That concentration is selected as the preferred colloidal antifoulant concentration. For example, in one such evaluation with a water sample, the measured zeta potentials were as shown in the following Table I:

TABLE I

| Antifouling Concentration, ppm | Zeta Potential Volts |
| --- | --- |
| 0 | −3.7 |
| 2 | −5.0 |
| 4 | −6.0 |

TABLE I-continued

| Antifouling Concentration, ppm | Zeta Potential Volts |
|---|---|
| 6 | −2.0 |

In this case, the addition of 4 parts per million (ppm) of the antifouling compound produced the smallest (most negative) zeta potential and was selected. Additional samples with smaller increments of antifouling compound concentration in the neighborhood of 4 ppm concentration could be prepared to determine the concentration more precisely, or an interpolation of the data could be used for the same purpose. Other antifouling compounds or combinations of compounds could also be tested, with the optimum selection based upon all of the data. This approach gives an optimum value based upon technical data. Cost might also play a part of the selection of one of several candidate antifouling compounds.

The zeta potential measurements are used to determine optimum antifoulant dosage. To find the actual time between cleanings of the RO system, further testing is required as described next.

An apparatus 80 used in determining the RO unit cleaning frequency is illustrated in FIG. 4. A sample of the feed liquid to be tested, with any flocculating agents or other pretreatments already added, is supplied in a tank 82, numeral 66 of FIG. 3. A cooling coil 84 is placed into the tank 82 to maintain the feed liquid at approximately constant temperature, as the results will vary with temperature changes during the course of the evaluation. A thermometer 85 measures the temperature of the sample in the tank 82, so that the flow through the cooling coil 84 can be adjusted to maintain the temperature approximately constant.

A feed pump 86 pumps the feed liquid under pressure to a test cell 88. The pressure of the feed liquid as it enters the test cell 88 is measured by a pressure gauge 89, and the flow through a bypass line 91 is adjusted as necessary to maintain the feed liquid at the desired approximately constant pressure. The feed liquid passes from an inlet 90 of the test cell 88 to a concentrate outlet 92, in a cross flow manner across a cleaning frequency membrane 94, numeral 68 of FIG. 3. In one embodiment, the cleaning frequency membrane 94 is a flat disk about 4 inches in diameter clamped inside the test cell 88, and is made of a material similar or identical to that of the filter support 46.

The cleaning frequency membrane 94 provides a permeation membrane of greater permeability than that of the reverse osmosis membrane 26. Permeation therefore occurs more rapidly. The rate of change of the permeation rate using the cleaning frequency membrane 94 is used to determine the required frequency of cleaning the actual reverse osmosis membrane 26.

Figure 5:
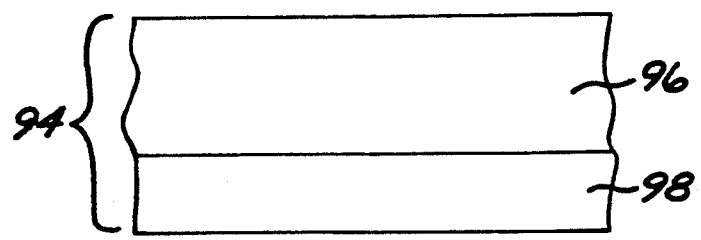
FIG. 5 is a sectional view of the membrane used in the test apparatus of FIG. 4.

FIG. 5 illustrates a preferred structure of the cleaning frequency membrane 94. The cleaning frequency membrane includes a layer 96 of a microporous material such as polysulfone, PVDF or cellulose acetate. The layer 96 rests on a layer 98. The layer 98 is preferably made of polyester of the same thickness as the base layer 42. Thus, the cleaning frequency membrane 94 is preferably of the same basic structure as the filter support layer 46 depicted in FIG. 2. Stated alternatively, the cleaning frequency membrane 96 used in the analysis procedure may be made of the RO membrane material, absent the molecular sieve layer 40 that decreases the permeation rate significantly. Other permeable membranes may be used as the cleaning frequency membrane, but they must have a sufficiently high permeability that the testing can be completed in a reasonable period of time.

The concentrate that does not pass through the cleaning frequency membrane 94 flows from the concentrate outlet 92 and is returned to the tank 82. The permeate that passes through the cleaning frequency membrane 94 leaves the test cell 88 through a permeate outlet 100 and is returned to the tank 82.

The time rate of change of the flow of permeate from the permeate outlet 100 is measured, numeral 70 of FIG. 3. Any satisfactory procedure can be used for this purpose, including flow measuring instrumentation or manual techniques. In a demonstration of the approach using the apparatus of FIG. 4, the following manual technique was used. At a specified time after the initiation of the flow of the feed liquid through the test cell, selected as 15 seconds in the demonstration, the permeate flowing from the permeate outlet 100 was captured in a graduated cylinder. The time required to collect 50 milliliters, t(15), was measured with a stopwatch. After measuring this collection time, the collected sample was returned to the tank 82, and the flow of permeate from the permeate outlet 100 was diverted to the tank 82. The apparatus 80 was operated for a period of time, selected to be 5 minutes (300 seconds) from the beginning of the procedure. The collection procedure was repeated, and a second time t(300) to collect 50 milliliters was measured. The time t(300) is greater than the time t(15) because of fouling of the cleaning frequency membrane 94 by colloidal material during the intervening period.

From this information, the cleaning frequency may be determined, numeral 72 of FIG. 3. In the preferred approach, the gallons of flow per day per square foot of membrane area for the 15 second and 300 second values is calculated as $$gfd(15) = 50/t(15) \times 263$$

$$gfd(300) = 50/t(300) \times 263,$$

where 263 is a dimensional analysis constant required to convert milliliters per square inch per second to gallons per square foot per day, the accepted measure of membrane permeability in the industry.

If necessary, the gfd(300) value is normalized to a constant temperature value gfd(300T) to account for any temperature change that occurred between the taking of the samples.

$$gfd(300T) = gfd(300) \times [TCF(300)],$$

where TCF is a temperature correction factor for the temperature measured at 15 seconds and 300 seconds, respectively. The temperature correction factor is given in the following Table II

TABLE II

| Temp. deg. C. | Temp. Correction Factor |
|---|---|
| 10 | 0.641 |
| 11 | 0.661 |
| 12 | 0.682 |
| 13 | 0.703 |
| 14 | 0.725 |
| 15 | 0.747 |
| 16 | 0.770 |
| 17 | 0.793 |
| 18 | 0.819 |
| 19 | 0.842 |

TABLE II-continued

| Temp. deg. C. | Temp. Correction Factor |
|---|---|
| 20 | 0.867 |
| 21 | 0.892 |
| 22 | 0.918 |
| 23 | 0.945 |
| 24 | 0.972 |
| 25 | 1.00 |
| 26 | 1.02 |
| 27 | 1.06 |
| 28 | 1.09 |
| 29 | 1.12 |
| 30 | 1.15 |

If the temperature control has maintained the temperature constant, no correction is necessary.

A "slope m" is calculated as $$m = [\log gfd(15) - \log gfd(300T)]/[-1.30]$$

and a cross flow fouling index CFI is calculated as $$CFI = \{[m - 0.0271]/gfd(15)\} \times 850 + 0.0271$$

Figure 6:
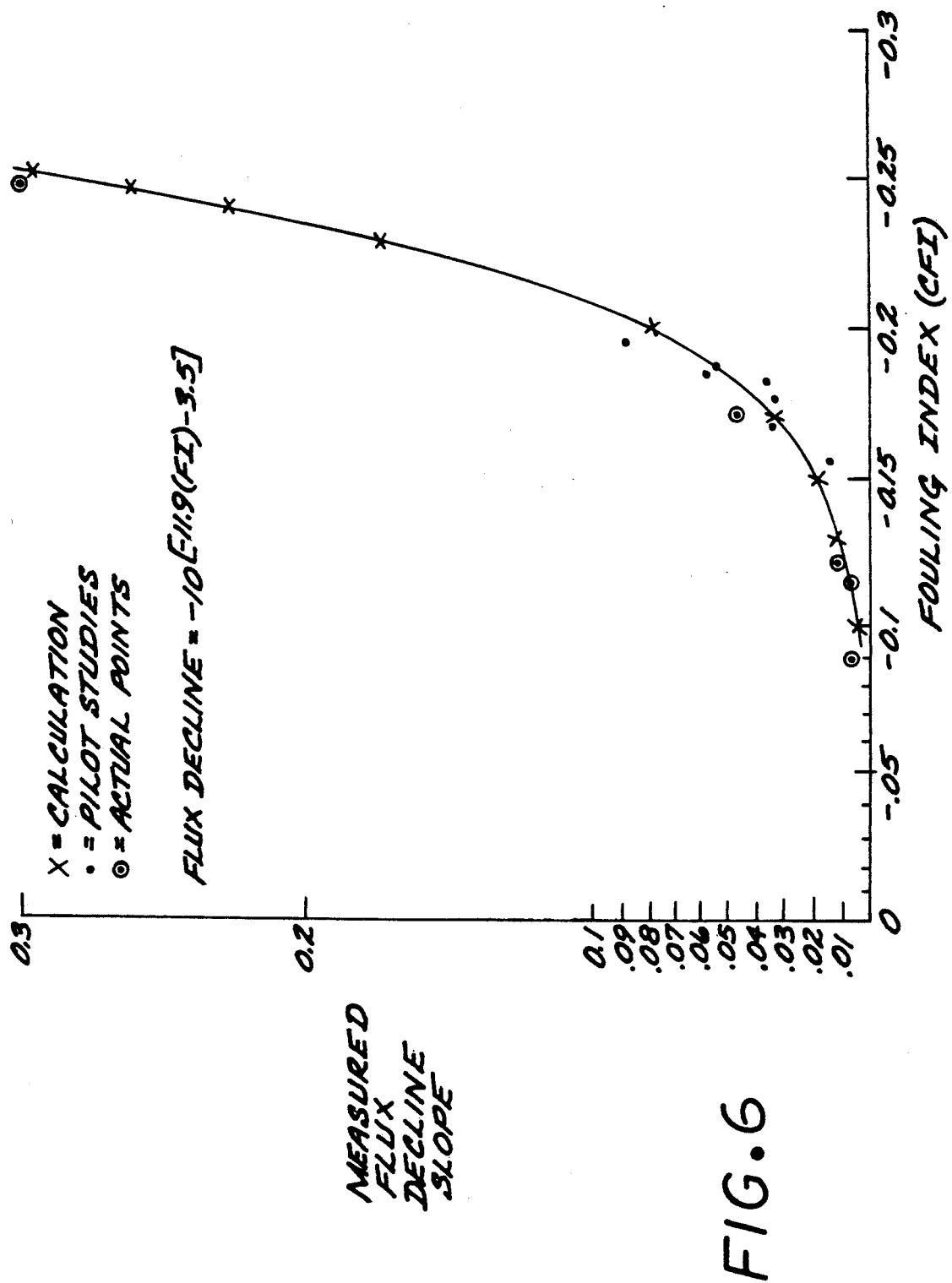
FIG. 6 is a graph of the measured flux decline slope of reverse osmosis units in service as a function of the cross-flow fouling index according to the present invention.
Figure 7:
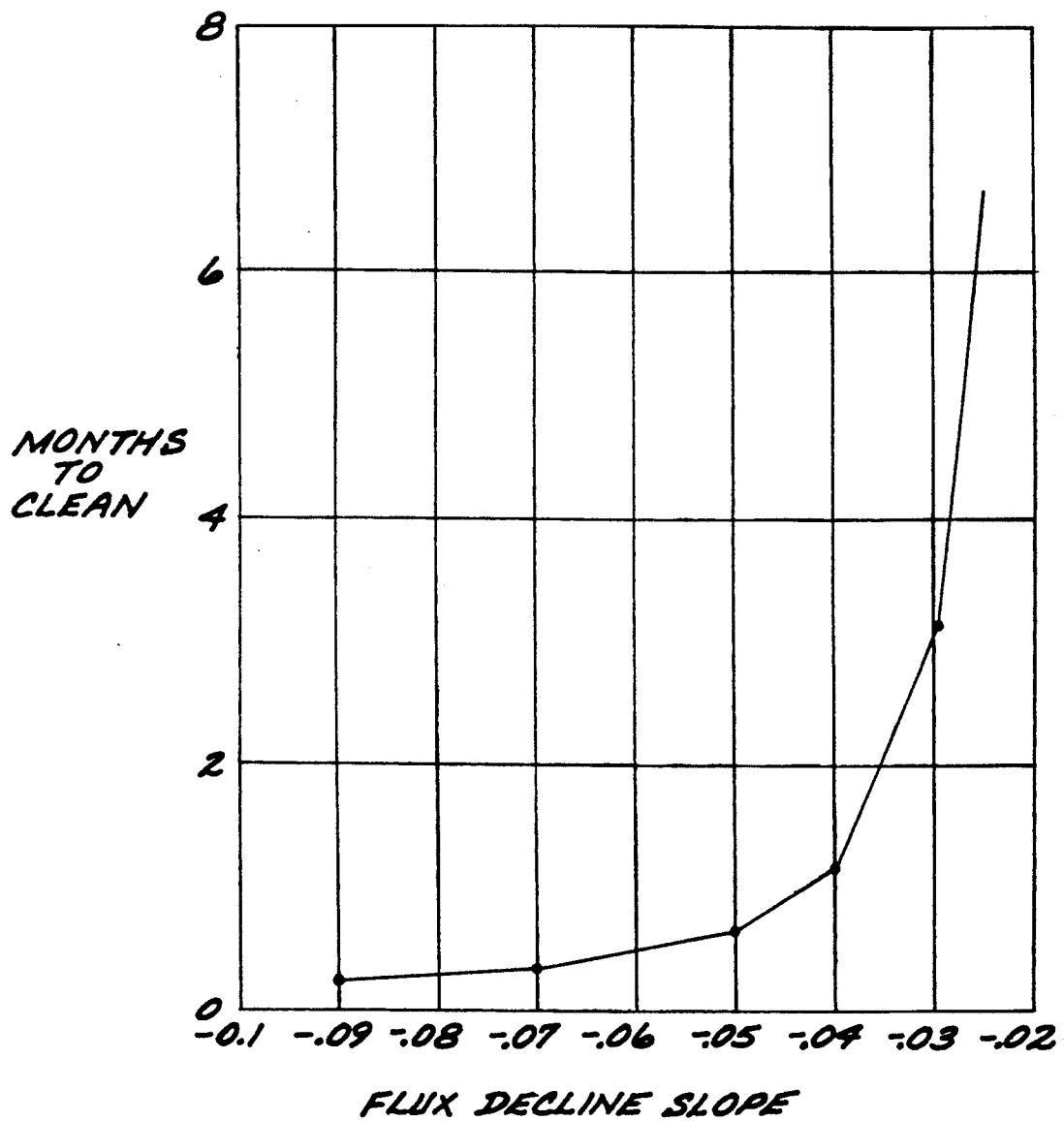
FIG. 7 is a graph of the months between maintenance cleanings as a function of flux decline slope.

The CFI is used to predict the cleaning frequency. FIG. 6 is a graph of the measure flux decline slope of some commercial RO units as a function of the CFI that was determined by the preceding approach. A correlation is observed, as indicated by the calculated line. Thus, once the CFI is determined by the approach just discussed, the flux decline slope of the commercial RO unit is predicted through the curve of FIG. 6. FIG. 7 is a graph of the time between maintenance cleaning for an RO unit, assuming a 10 percent decline in performance between maintenances, as a function of the flux decline slope. Thus, from the CFI determined as described above, the flux decline slope is estimated using FIG. 6. Once the predicted flux decline slope is estimated, that value is used in FIG. 7 to estimate the months between required cleanings.

The present invention therefore provides an approach and an apparatus for determining optimal amounts of colloidal antifouling compounds to be added to reverse osmosis flows, and for estimating the time required between maintenance of the reverse osmosis units when the liquid flows are treated. Although particular embodiments of the invention have been described in detail for purposes of illustration, various modifications may be made without departing from the spirit and scope of the invention. Accordingly, the invention is not to be limited except as by the appended claims.

What is claimed is:

1. A method of determining the optimum cleaning approach for a reverse osmosis membrane, comprising the steps of:
   providing a set of samples of a liquid to be purified in a reverse osmosis system, the samples having a range of antifoulant concentrations added;
   measuring the zeta potential for each sample; and
   selecting the concentration of antifoulant that provides the lowest (most negative) zeta potential as the preferred antifoulant concentration and determining the optimum cleaning approach for a reverse osmosis membrane in response to a parameter measured by passing a sample having said preferred antifoulant concentration through a membrane.

2. The method of claim 1, wherein the liquid is water.

3. The method of claim 1, wherein the method contains the additional steps, after the step of selecting, of
   preparing a cleaning frequency sample of the liquid to be purified with the preferred antifoulant concentration;
   passing the cleaning frequency sample in a cross flow manner across a cleaning frequency membrane that passes dissolved matter in the permeate but does not pass colloidal material; and
   measuring the rate of change in flow of the permeate of the cleaning frequency sample as a function of time.

4. The method of claim 3, including the additional step, after the step of measuring, of
   determining the cleaning frequency of the cleaning frequency sample from the rate of change in flow as a function of time.

5. The method of claim 3, wherein the step of passing is accomplished using apparatus comprising
   means for supplying a flow of a liquid to be purified by reverse osmosis; and
   a test cell having
      a cleaning frequency membrane,
      an inlet for introducing a flow of the liquid to be purified to a first side of the cleaning frequency membrane,
      a concentrate outlet on the first side of the cleaning frequency membrane arranged so that the flow of liquid passes over the first side of the cleaning frequency membrane in flowing from the inlet to the concentrate outlet, and
      a permeate outlet on a second side of the cleaning frequency membrane.

6. A method of determining the optimum antifoulant concentration and cleaning interval for a reverse osmosis membrane, comprising the steps of:
   providing samples of a liquid to be purified in a reverse osmosis system, the samples having a range of antifoulant concentrations added;
   measuring the zeta potential for each sample;
   selecting the preferred concentration of antifoulant as that which provides the lowest zeta potential;
   preparing a cleaning frequency sample of the liquid to be purified with the preferred antifoulant concentration;
   passing the cleaning frequency sample across one side of a membrane, so that a fraction of the cleaning frequency sample passes through the membrane as a permeate, the membrane being selected such that it passes dissolved matter in the permeate but does not pass colloidal material;
   measuring the rate of change in flow of the permeate of the cleaning frequency sample through the membrane as a function of time; and
   determining the cleaning frequency of the cleaning frequency sample from a preexisting correlation, using the rate of change in flow of the permeate as a function of time.

7. A method of determining the cleaning interval for a reverse osmosis membrane having molecular sieve layer, comprising the steps of:
   providing a cleaning frequency sample of a reverse osmosis feed liquid;
   passing the sample across one side of a cleaning frequency membrane, so that a fraction of the cleaning frequency sample passes through the cleaning frequency membrane as a permeate, the cleaning frequency membrane being selected such that it passes dissolved matter in the permeate but does not pass colloidal material at a rate relatively rapid compared to said sample being passed through said reverse osmosis membrane;

measuring the rate of change in flow of the permeate of the sample through the membrane as a function of time; and determining the cleaning frequency of the reverse osmosis membrane, the reverse osmosis membrane comprising the same membrane material as used in the cleaning frequency membrane of the step of passing, from the rate of change in flow of the permeate as a function of time.

8. Apparatus for use in determining the required cleaning frequency for a reverse osmosis filter element, comprising:

means for supplying a flow of a liquid capable of being purified by a reverse osmosis membrane having a molecular sieve layer; and a test cell having a cleaning frequency membrane constructed and arranged to pass dissolved matter in a permeate but to not pass colloidal material at a rate relatively rapid compared to said liquid being purified by the reverse osmosis membrane, an inlet on a first side of the cleaning frequency membrane for introducing a flow of the liquid to be purified to a first side of the cleaning frequency membrane, a concentrate outlet on the first side of the cleaning frequency membrane disposed so that the flow of liquid introduced from the inlet contacts the first side of the cleaning frequency membrane in flowing to the concentrate outlet, and a permeate outlet on a second side of the cleaning frequency membrane.

9. The apparatus of claim 8, wherein the cleaning frequency membrane includes a layer of a polysulfone.

10. The apparatus of claim 8, wherein the cleaning frequency membrane of the test cell is in the form of a flat plate.

11. The apparatus of claim 8, wherein the means for supplying includes a constant temperature feed supply, and a pump that pumps liquid from the feed supply to the inlet of the test cell.

12. The apparatus of claim 11, wherein the apparatus further includes return lines that return the concentrate and the permeate to the feed supply.

13. The apparatus of claim 8, further including means for measuring the time rate of flow of permeate.

* * * * *